June 12, 1962 D. D. DE FORD 3,038,326
CHROMATOGRAPHIC ANALYZER
Filed June 2, 1958

INVENTOR.
D. D. DE FORD
BY *Hudson & Young*
ATTORNEYS

United States Patent Office 3,038,326
Patented June 12, 1962

3,038,326
CHROMATOGRAPHIC ANALYZER
Donald D. De Ford, Glenview, Ill., assignor to Phillips Petroleum Company, a corporation of Delaware
Filed June 2, 1958, Ser. No. 739,252
10 Claims. (Cl. 73—23)

This invention relates to the analysis of fluid streams by means of elution chromatography.

In various industrial and laboratory operations there is a need for analysis procedures which are capable of measuring small concentrations of constituents in fluid mixtures. One procedure which presently is becoming quite valuable for such fluid analyses involves elution chromatography. In elution chromatography, a sample of the material to be separated is introduced into a column which contains a selective adsorbent or absorbent. A carrier gas is directed into the column so as to tend to force the sample material therethrough. The sorbent attempts to hold the constituents of the sample, whereas the stripping gas tends to pull them through the column. This results in the several constituents of the fluid mixture traveling through the column at different rates of speed, depending upon their affinities for the sorbent. The column effluent thus consists initially of the carrier gas, the individual constituents of the fluid mixture appearing at later spaced time intervals. It is common practice to detect these constituents by means of a thermal conductivity analyzer which compares the thermal conductivity of the effluent gas with the thermal conductivity of the carrier gas introduced into the column.

In order to obtain an efficient separation between the constituents of the fluid mixture to be analyzed, it is common practice to employ a relatively long column containing a substantial amount of sorbent. This results in a substantial pressure drop across the column and requires a relatively long time to complete an analysis of a gas sample.

In accordance with the present invention, there is provided an improved chromatographic analyzer which permits fluid analyses to be made in a rapid manner. The chromatographic column comprises a first elongated hollow member which encloses a second elongated member. A suitable absorbent, such as a viscous oil, is disposed in the region between the two members. The gas mixture to be analyzed is introduced into the region between the members at one end and the effluent gas is removed from the other end. One of the members is rotated relative to the other so that the gas is forced into contact with the absorbent by means of centrifugal force. This results in the gas following a helical path in moving between the two ends of the column. It is thus possible to obtain intimate contact between the gas and the absorbent in a rapid manner.

Accordingly, it is an object of this invention to provide an improved chromatographic analyzer which utilizes a rotating member to provide intimate contact between a gas sample and an absorbing material.

Another object is to provide an improved method of separating constituents of a fluid mixture by means of centrifugal force.

A further object is to provide an improved chromatographic analyzer which permits fluid samples to be analyzed in a relatively short time.

Other objects, advantages and features of the invention should become apparent from the following detailed description which is taken in conjunction with the accompanying drawing in which.

Figure 1:
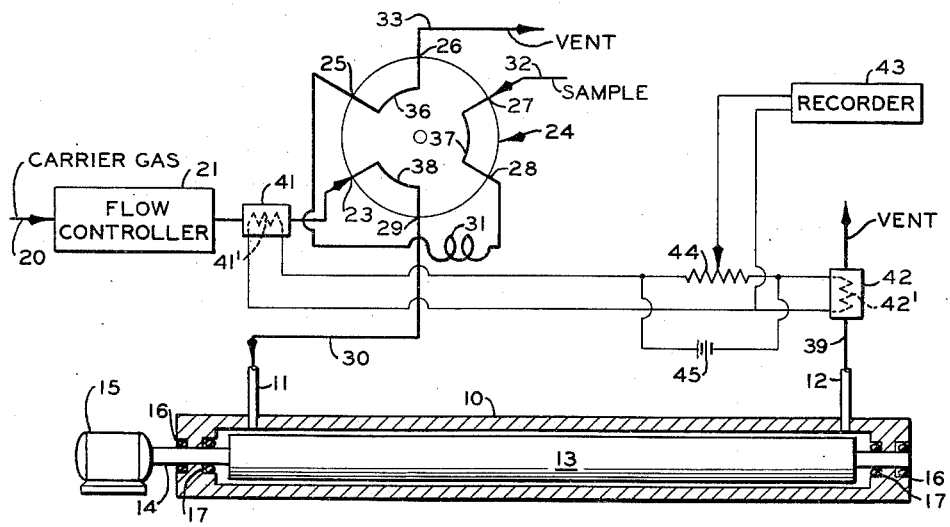
FIGURE 1 is a schematic view of a chromatographic analyzer having a first embodiment of the contacting chamber of this invention incorporated therein.

Referring now to the drawing in detail and to FIGURE 1 in particular, there is shown a stationary hollow cylindrical member 10 which is provided with an inlet conduit 11 at one end and an outlet conduit 12 at the second end. A second elongated cylindrical member 13 is disposed axially within member 10. Member 13 is mounted on a shaft 14 which is rotated by a motor 15. Shaft 14 extends through the ends of member 10 which contains bearings 16. Sealing rings 17 are also provided in the ends of member 10 to prevent loss of fluid from the interior thereof.

A carrier gas is introduced into the system through a conduit 20 which has a flow controller 21 therein. Conduit 20 communicates with the first port 23 of a rotary valve 24. Valve 24 is provided with additional ports 25, 26, 27, 28 and 29 which are spaced approximately 60° from one another. When the valve is in the position shown, port 29 is connected by a conduit 30 to conduit 11. Ports 25 and 28 are connected to one another by means of a conduit 31. A gas sample to be analyzed is introduced into the system through a conduit 32 which communicates with port 27. A vent conduit 33 is connected to port 26. Valve 24 is provided with a passage 36 which connects ports 25 and 26. Ports 27 and 28 are similarly connected by a passage 37, and ports 23 and 29 are connected by a passage 38. A vent conduit 39 is connected to conduit 12.

Detector cells 41 and 42 are disposed in respective conduits 20 and 39. These detector cells preferably contain temperature sensitive resistance elements 41' and 42' which are in thermal contact with the fluids flowing through conduits 20 and 39, respectively. The first terminals of elements 41' and 42' are connected to one another and to the first input terminal of a recorder 43. The second terminals of elements 41' and 42' are connected to the respective end terminals of a potentiometer 44. The contactor of potentiometer 44 is connected to the second input terminal of recorder 43. A voltage source 45 is connected across the end terminals of potentiometer 44. It should thus be evident that elements 41' and 42' constitute adjacent arms of a Wheatstone bridge network which serves to compare the resistances of these two elements. The signal applied to recorder 43 is representative of the ratio of the resistances of elements 41' and 42', and this in turn is representative of the ratio of the thermal conductivities of the gas flowing through respective conduits 20 and 39.

The inner wall of cylindrical member 10 is coated with a relatively viscous oil which selectively absorbs the constituents of a fluid sample to be analyzed. Such a material can comprise a silicone oil, a hydrocarbon oil having more than approximately 12 carbon atoms per molecule, dimethylsulfolane, or any other material which is capable of selectively absorbing the constituents of the gas sample. It is generally preferred that such an oil have a relatively high boiling point in order that this oil be retained within the column.

At the beginning of an analysis cycle, valve 24 is in the position illustrated so that the carrier gas enters conduit 11 at a predetermined rate which is maintained by flow controller 21. Examples of suitable carrier gases which can be employed include helium, nitrogen, carbon dioxide, air, argon, and the like. The fluid sample to be analyzed flows through conduit 31 and is vented through conduit 33. At this time recorder 43 should indicate that the resistances of elements 41' and 42' are equal because the carrier gas alone is flowing past both of these elements. Valve 24 is then rotated in either a clockwise or a counterclockwise direction 60° so that ports 23 and 25 are in communication, ports 26 and 27 are in communication, and ports 28 and 29 are in communication. The carrier gas forces the volume of sample gas which was trapped in conduit 31 at the time of the rotation into conduit 11. The constant flow of carrier gas tends to push the constituents of the sample mixture through the region between members 10 and 13. The rotation of member 13 by means of motor 15 results in the gas being forced outwardly into contact with the oil which coats member 10. The carrier gas and the sample constituents thus tend to flow in a helical path between conduits 11 and 12. The least readily absorbed constituent of the gas sample first appears in the effluent from conduit 12. This changes the signal applied to recorder 42 because of the change in heat that is dissipated by resistance element 42', and thus its resistance. The other constituents of the sample mixture appear at later time intervals and likewise change the resistance of element 42'.

In the embodiment of the column illustrated in FIGURE 1, both elements 10 and 13 are of cylindrical configuration. It is desirable that the space between the two elements be as small as is mechanically feasible. Spacings of the order of 0.004 to 0.006 inch have been found to be satisfactory. Element 13 can be formed of metal or of any other suitable material. Inert plastic materials such as polymerized tetrafluoroethylene and nylon can be employed to advantage in the construction of element 13 because of their lubricating properties. Element 13 can be rotated at any suitable speed, 2000 to 6000 revolutions per minute for example.

Figure 2:
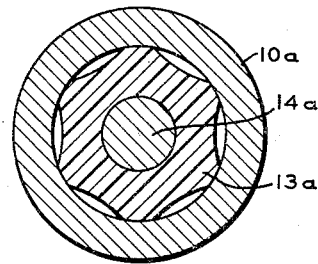
FIGURE 2 is a sectional view of a second embodiment of the contacting chamber.

In FIGURE 2 there is shown a second embodiment of the contacting chamber. The outer member 10a is formed of metal and inner member 13a is formed of a plastic material, such as polymerized tetrafluoroethylene or nylon. Member 13a is carried by a shaft 14a and is of a generally hexagonal configuration with the edges making contact with element 10a. The faces of element 13a between these edges are recessed to form areas that trap the carrier and sample gases. Rotation of member 13a thus results in these gases being carried around the column and into engagement with the oil which coats the inner surface of element 10a. This oil also serves to lubricate the contacting surfaces between elements 10a and 13a. In this embodiment, the speed of rotation is preferably of the order of several hundred revolutions per minute.

Figure 3:
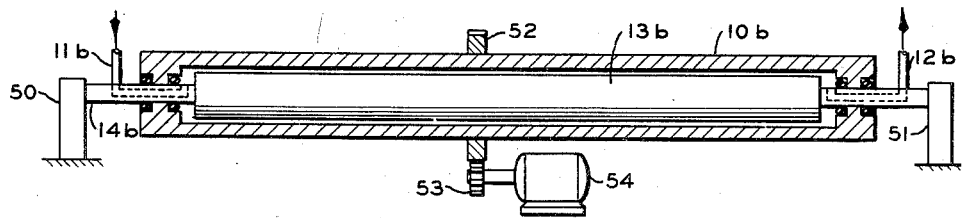
FIGURE 3 is a schematic view of a third embodiment of the contacting chamber.

In FIGURE 3 there is shown a third embodiment of the contacting chamber of this invention. In this embodiment, member 13b is retained stationary and member 10b is rotated. Member 13b is rigidly mounted by means of supports 50 and 51 which engage the ends of a stationary shaft 14b. Inlet conduit 11b extends through one end of shaft 14b and outlet conduit 12b extends through the second end of shaft 14b. A spur gear 52 is carried by member 10b to engage a spur gear 53 on the drive shaft of a motor 54. Motor 54 thus rotates member 10b about member 13b. It should be evident that these members can be either cylindrical as shown in FIGURE 1 or of a configuration such as shown in FIGURE 2.

As illustrated, the apparatus shown in FIGURES 1, 2 and 3 can advantageously be operated with the contacting chamber in a generally horizontal position. This tends to prevent the absorbent from moving out of the tube by the force of gravity. However, other positions can also be employed. It is desirable that the contacting chamber be maintained at a uniform temperature.

Figure 4:
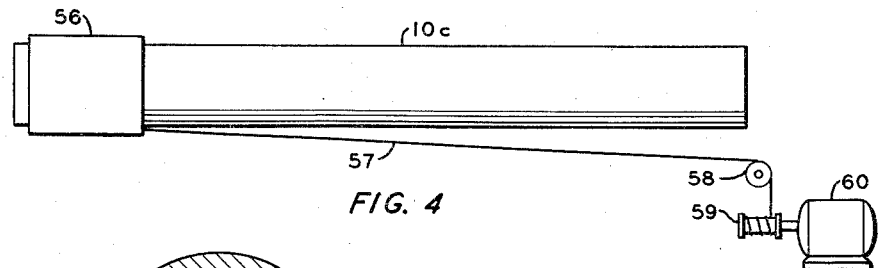
FIGURE 4 is a schematic representation of a thermal chromatographic analyzer utilizing the contacting chamber of this invention.

In FIGURE 4 there is shown a schematic representation of a thermal chromatographic analyzer which utilizes the novel contacting chamber of this invention. An annular heating element 56 is positioned about member 10c. A cable 57 extends from heating element 56 about a guide wheel 58 to a reel 59 which is driven by a motor 60. At the beginning of the analysis cycle, heating element 56 is adjacent the inlet end of the contact chamber. This element is moved slowly toward the second end of the chamber as the sample to be analyzed flows through the chamber. The most volatile and least strongly absorbed constituents of the sample stream tend to move rapidly through the contacting chamber until they reach regions which are cooler than the region adjacent heating element 56. The speeds of movement of the constituents are then slowed down due to the decreasing volatilities and greater absorption, the more strongly absorbed constituents tending to be retained in the chamber at regions of high temperature near the heating element. A separation is thus effected as the heating element then moves toward the contact chamber outlet, the individual constituents of the fluid mixture being desorbed and eluted one by one. It should be evident that heating element 56 can be employed either with a stationary outer member as shown in FIGURE 1 or with a rotating outer member as shown in FIGURE 3. If a rotating outer member is employed, gear 52 can be mounted on the end of member 10b so that an unobstructed path is provided for movement of heating element 56.

In view of the foregoing description of this invention it should be evident that there is provided an improved chromatographic analyzer which utilizes a rotating member to effect intimate contacting between a gas sample to be analyzed and an absorbing material. This contacting chamber permits analyses to be performed in a much more rapid manner than has been possible heretofore with conventional packed chromatographic columns.

While the invention has been described in conjunction with present preferred embodiments, it should be evident that it is not limited thereto.

What is claimed is:

1. A chromatographic analyzer comprising a first hollow member of generally cylindrical configuration, a second member of generally cylindrical configuration positioned within and coaxially of said first member, said first and second members being spaced from one another and having a liquid absorbent positioned in the region therebetween, means to rotate one of said members relative to the other about the common axis at a speed sufficient to cause said absorbent to coat a substantial portion of said first member and to impart a helical path to gases flowing therethrough, first conduit means communicating with said region between said members adjacent first ends of said members, second conduit means communicating with said region between said members adjacent second ends of said members, said first conduit means being adapted to pass a sample of gas to be analyzed, third conduit means adapted to pass a carrier gas and communicating with said first conduit means, and means to compare the compositions of gases in said third and second conduit means.

2. The analyzer of claim 1 wherein the inner wall of said first member is of circular cross-section and the outer surface of said second member is of circular cross-section substantially the same diameter as the internal diameter of said first member, the outer surface of said second member being provided with a plurality of depressions extending longitudinally of said second member to provide spaces between said first and second members.

3. The analyzer of claim 1 further comprising an annular heating element enclosing said first member, and means to move said heating element longitudinally of said first member.

4. A chromatographic analyzer comprising a first hollow member of generally cylindrical configuration, a second member of generally cylindrical configuration positioned within and coaxially of said first member, said first and second members being spaced from one another and having a liquid absorbent positioned in the region therebetween, means to rotate one of said members relative to the other about the common axis at a speed sufficient to cause said absorbent to coat a substantial portion of said first member and to impart a helical path to gases flowing therethrough, first conduit means communicating with said region between said members adjacent first ends of said members, second conduit means communicating with said region between said members adjacent second ends of said members, third conduit means communicating with said first conduit means to introduce a carrier gas into said first conduit means, fourth conduit means to introduce a sample gas to be analyzed, valve means to connect said fourth conduit means selectively to said first conduit means to introduce a predetermined volume of sample gas, and means to compare the compositions of gases in said third and second conduit means.

5. The analyzer of claim 4 wherein said means to compare comprises a first temperature sensitive resistance element positioned within said third conduit means, a second temperature sensitive resistance element positioned within said second conduit means, and means to compare the resistances of said elements.

6. Apparatus for use in the analysis of gaseous mixtures comprising a first hollow cylindrical member closed at the two ends thereof, a second cylindrical member positioned within and coaxially of said first member, the outer diameter of said second member being substantially the same as the inner diameter of said first member, one of said members being provided with a plurality of recesses in the surface thereof extending longitudinally of said member, means to rotate one of said members relative to the other about the common axis at a speed sufficient to impart a helical path to gases flowing therethrough, first conduit means communicating with the interior of said first member adjacent the first end thereof, second conduit means communicating with the interior of said first member adjacent the second end thereof, said first conduit means being adapted to pass a sample of gas to be analyzed, third conduit means adapted to pass a carrier gas and communicating with said first conduit means, and means to compare the compositions of gases in said third and second conduit means.

7. Apparatus for use in the analysis of gaseous mixtures comprising a first hollow cylindrical member closed at the two ends thereof, a second cylindrical member positioned within and coaxially of said first member, the outer diameter of said second member being substantially the same as the inner diameter of said first member, said second member being provided with a plurality of recesses in the surface thereof extending longitudinally of said second member, a liquid absorbent partially filling said recesses, means to rotate one of said members relative to the other about the common axis, first conduit means communicating with the interior of said first member adjacent the first end thereof, and second conduit means communicating with the interior of said first member adjacent the second end thereof.

8. The apparatus of claim 7 further comprising an annular heating element enclosing said first member, and means to move said heating element longitudinally of said first member.

9. The method of analyzing a gaseous mixture which comprises passing said mixture through an elongated annular zone, said zone being defined by surfaces, moving one of said surfaces relative to another at a speed sufficient to cause said mixture to come into intimate contact with a liquid absorbent contained therein by reason of a helical flow path being imparted to said mixture by said moving, and measuring a property of the effluent from said zone which is representative of the composition thereof.

10. The method of claim 9 which further comprises progressively heating sections of said zone in a direction longitudinally of the axis of said annular zone.

References Cited in the file of this patent

UNITED STATES PATENTS

| | | |
|---|---|---|
| 2,398,818 | Turner | Apr. 23, 1946 |
| 2,465,229 | Hipple | Mar. 22, 1949 |
| 2,603,305 | Hachmuth | July 15, 1952 |
| 2,617,986 | Miller | Nov. 11, 1952 |
| 2,891,630 | Hall et al. | Apr. 30, 1956 |
| 2,920,478 | Golay | Jan. 12, 1960 |